United States Patent
Araki et al.

(10) Patent No.: US 7,768,268 B2
(45) Date of Patent: Aug. 3, 2010

(54) VERIFICATION OF A GROUND CONNECTION FABRICATION PROCESS FOR ESD RESISTORS IN MAGNETIC HEADS

(75) Inventors: Satoru Araki, San Jose, CA (US); Robert S. Beach, Los Gatos, CA (US); David J. Seagle, Morgan Hill, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 399 days.

(21) Appl. No.: 11/965,479

(22) Filed: Dec. 27, 2007

(65) Prior Publication Data

US 2009/0168213 A1 Jul. 2, 2009

(51) Int. Cl.
*G01R 31/14* (2006.01)
*G01R 31/26* (2006.01)
*G11B 5/127* (2006.01)

(52) U.S. Cl. .................. 324/509; 324/765; 438/18; 360/323

(58) Field of Classification Search .......... 324/457, 324/509, 525, 536, 765; 438/17, 18; 360/323; 361/42–50
See application file for complete search history.

(56) References Cited

U.S. PATENT DOCUMENTS

| | | | | |
|---|---|---|---|---|
| 4,479,088 A | * | 10/1984 | Stopper | 324/525 |
| 5,539,598 A | * | 7/1996 | Denison et al. | 360/323 |
| 5,764,454 A | | 6/1998 | Hishida | |
| 5,923,048 A | * | 7/1999 | Inoue | 257/48 |
| 6,166,880 A | | 12/2000 | Kobayashi et al. | |
| 6,400,534 B1 | * | 6/2002 | Klaassen | 360/323 |
| 6,424,505 B1 | * | 7/2002 | Lam et al. | 360/323 |
| 6,650,511 B2 | | 11/2003 | Hsiao et al. | |
| 6,731,110 B2 | | 5/2004 | Church | |
| 6,870,706 B1 | * | 3/2005 | Zhu | 360/323 |
| 6,927,569 B2 | | 8/2005 | Worledge et al. | |
| 7,146,711 B2 | | 12/2006 | Han et al. | |

(Continued)

OTHER PUBLICATIONS

"CPP Read-Head Technology Enables Smaller Form Factor Storage", Fujitsu Computer Products of America Inc. Whitepaper, www.fcpa.fujitsu.com (2006).

(Continued)

*Primary Examiner*—Timothy J Dole
(74) *Attorney, Agent, or Firm*—Duft Bornsen & Fishman, LLP

(57) ABSTRACT

Test methods and components are disclosed for testing the quality of the ground connection fabrication process for ESD shunt resistors in magnetic heads. A wafer is populated with one or more test components along with magnetic heads. The test components are fabricated with ESD shunt resistor ground connections created by the same or similar process used to fabricate the ESD shunt resistor ground connections in magnetic heads on the wafer. The resistance of the test component ground connections may then be measured in order to determine the quality of the ground connections formed by the fabrication process. The quality of the ground connection fabrication process may then be determined based on the measured resistance of the test components.

12 Claims, 6 Drawing Sheets

U.S. PATENT DOCUMENTS

| | | |
|---|---|---|
| 7,190,556 B2 | 3/2007 | Zhu |
| 7,589,537 B1 * | 9/2009 | Kraz .......................... 324/509 |
| 2002/0013667 A1 * | 1/2002 | Zemer et al. .................. 702/57 |
| 2005/0201019 A1 * | 9/2005 | Zhu et al. ................... 360/323 |
| 2007/0133130 A1 | 6/2007 | Biskeborn |
| 2007/0133131 A1 | 6/2007 | Biskeborn |

OTHER PUBLICATIONS

Mao, Sining, "Structure and performance of TGMR heads for next-generation HDDs", http://sst.pennet.com/Articles/Article_Display.cfm?Section=Archives&Subsection=Display&ARTICLE_ID=211234 (Sep. 2004).

"Head Technology for High Density Magnetic Recording", Fujitsu Laboratories Ltd. (Jul. 2005).

* cited by examiner

VERIFICATION OF A GROUND CONNECTION FABRICATION PROCESS FOR ESD RESISTORS IN MAGNETIC HEADS

BACKGROUND OF THE INVENTION

1. Field of the Invention

The invention is related to the field of wafer process verification, and in particular, to verifying processes for fabricating ground connections for electrostatic discharge (ESD) resistors in magnetic heads.

2. Statement of the Problem

Wafer fabrication is a procedure composed of many repeated sequential processes to produce electrical circuits, devices, components, etc. One type of device formed through wafer fabrication is magnetic heads. Magnetic heads are used to write to magnetic recording disks and to read from magnetic recording disks, such as in a hard disk drive. Magnetic heads typically include a read element and a write element. The structure of a read element includes a first shield, a magnetoresistance (MR) sensor formed on the first shield, and a second shield formed on the MR sensor. The MR sensor may comprise a Giant MR (GMR) sensor, a Tunneling MR (TMR) sensor, or another type of MR sensor. If the read element is being operated in a current perpendicular to plane (CPP) fashion, then the first shield and the second shield are electrically connected to opposing surfaces of the MR sensor to act as current leads for a sense current that is injected perpendicularly through the MR sensor.

The MR sensor is sensitive to electrostatic discharge (ESD) damage, which may occur during the manufacturing process. Once the MR sensor is damaged, the MR sensor may not show any indication until the magnetic head is assembled and tested. Damage from an ESD event may cause the performance of the MR sensor to be below specification, or may cause an early failure in the MR sensor during operation. The prevention of ESD damage to the MR sensor is a manufacturing goal, as it increases the yield of the magnetic heads and reduces costs of manufacture.

One method of ESD protection of the MR sensor comprises connecting resistors from the first shield and second shield to a ground connection, herein referred to as an ESD protection circuit. The resistors operate to dissipate any accumulated charge that may build up on the first shield and second shield by transferring the stored charge to the ground connection. This reduction of stored charge proximal to the MR sensor is desired to reduce the possibility of an ESD event causing damage to the MR sensor.

The ESD protection circuit may fail if an inadequate ground connection is fabricated. With an inadequate ground connection, the resistors connected to the first shield and the second shield of the MR sensor will not operate to dissipate charge stored on the shields to the ground connection. This may cause charge to accumulate, leading to an ESD event and damage to the MR sensor.

It would therefore be desirable to effectively and efficiently test the quality of the ground connections for an ESD protection circuit in magnetic heads.

SUMMARY OF THE INVENTION

Embodiments of the invention include test components that are fabricated on a wafer along with the magnetic heads. Part of the process of fabricating the test components includes fabricating ground connections, much is like performed in fabricating the ground connection in the ESD protection circuit. The test components are further fabricated in a manner that allows for electrical testing of the ground connections created by the fabrication process. The electrical testing in the test component on the wafer advantageously allows fabricators to determine the quality of the processes used to fabricate the ground connection in the ESD protection circuit.

One embodiment of the invention comprises a method of testing the quality of the fabrication processes used to form a ground connection for ESD resistors in magnetic heads. For the method, a test component is fabricated along with magnetic heads on a wafer to include one or more ground connections. The ground connections on the test component are formed concurrently with the ground connections for the ESD resistors in the magnetic heads. A resistance of the ground connections of the test component is then measured. The measured resistance may be used to determine the quality of the fabrication processes used to form the ground connections for the ESD resistors in the magnetic heads.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-9 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
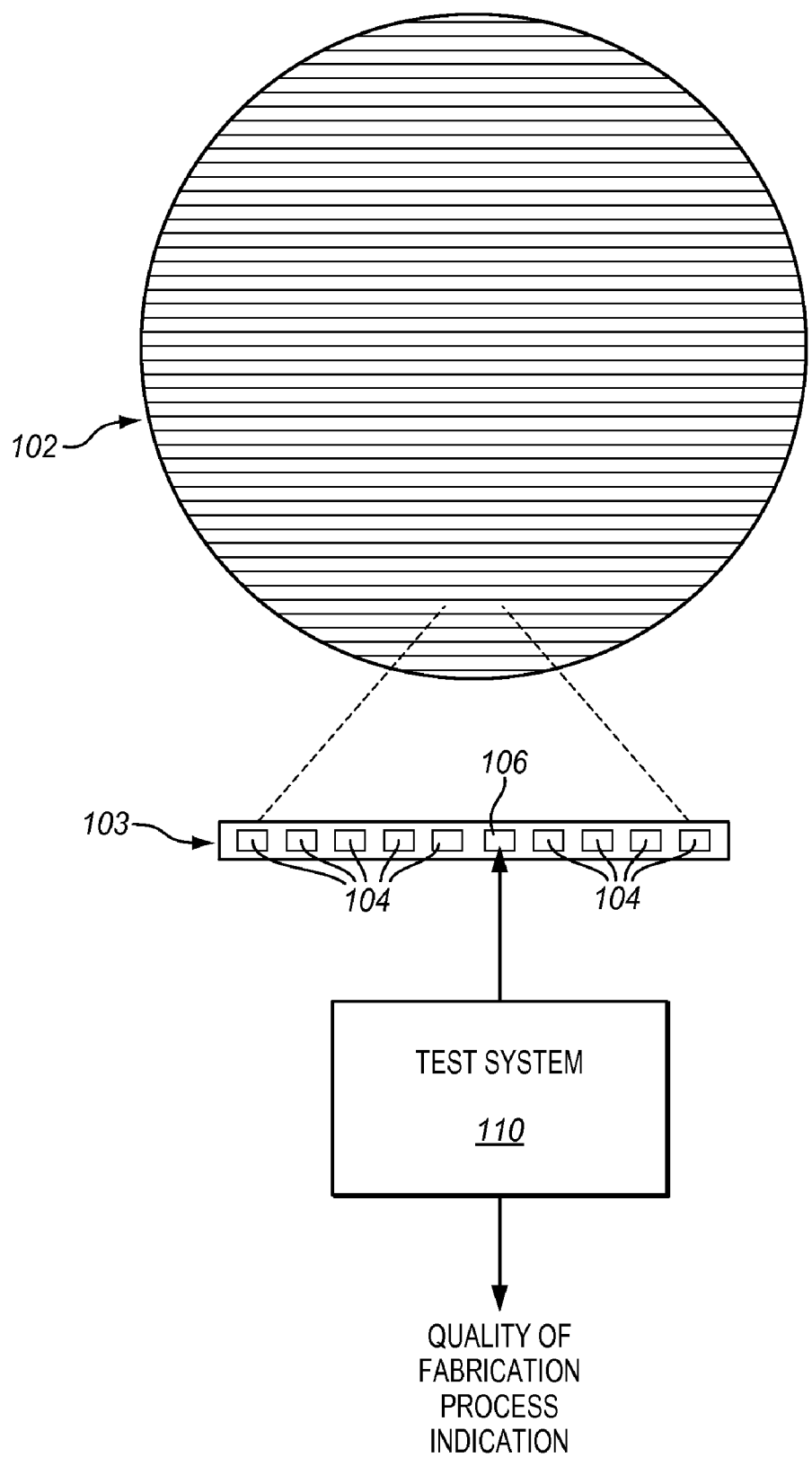
FIG. 1 illustrates a wafer in an exemplary embodiment of the invention.

FIG. 1 illustrates a wafer 102 in an exemplary embodiment of the invention. Wafer 102 comprises a plurality of rows of components, which are illustrated by the horizontal lines across wafer 102. Reference number 103 illustrates a magnified view of a portion of a row on wafer 102. This row on wafer 102 includes a plurality of magnetic heads 104 that are fabricated with functional read elements. A functional read element as provided herein is an actual read element that will be used to read from a magnetic recording media, such as a in hard disk drive. A functional read element includes a first shield, an MR sensor, and a second shield, among other layers. This row on wafer 102 also includes one or more test components 106.

A test component comprises a component fabricated on the wafer in order to determine the quality of a fabrication process in forming ground connections for the ESD protection circuit in magnetic heads 104. Although one test component 106 is illustrated in FIG. 1, wafer 102 may be populated with multiple test components 106. Test components 106 may be staggered throughout the wafer 102 in order to provide a sampling of the fabrication process at different positions on wafer 102. Test component 106 is configured such that a test system 110 is able to perform measurements to determine the quality of the fabrication process.

Figure 2:
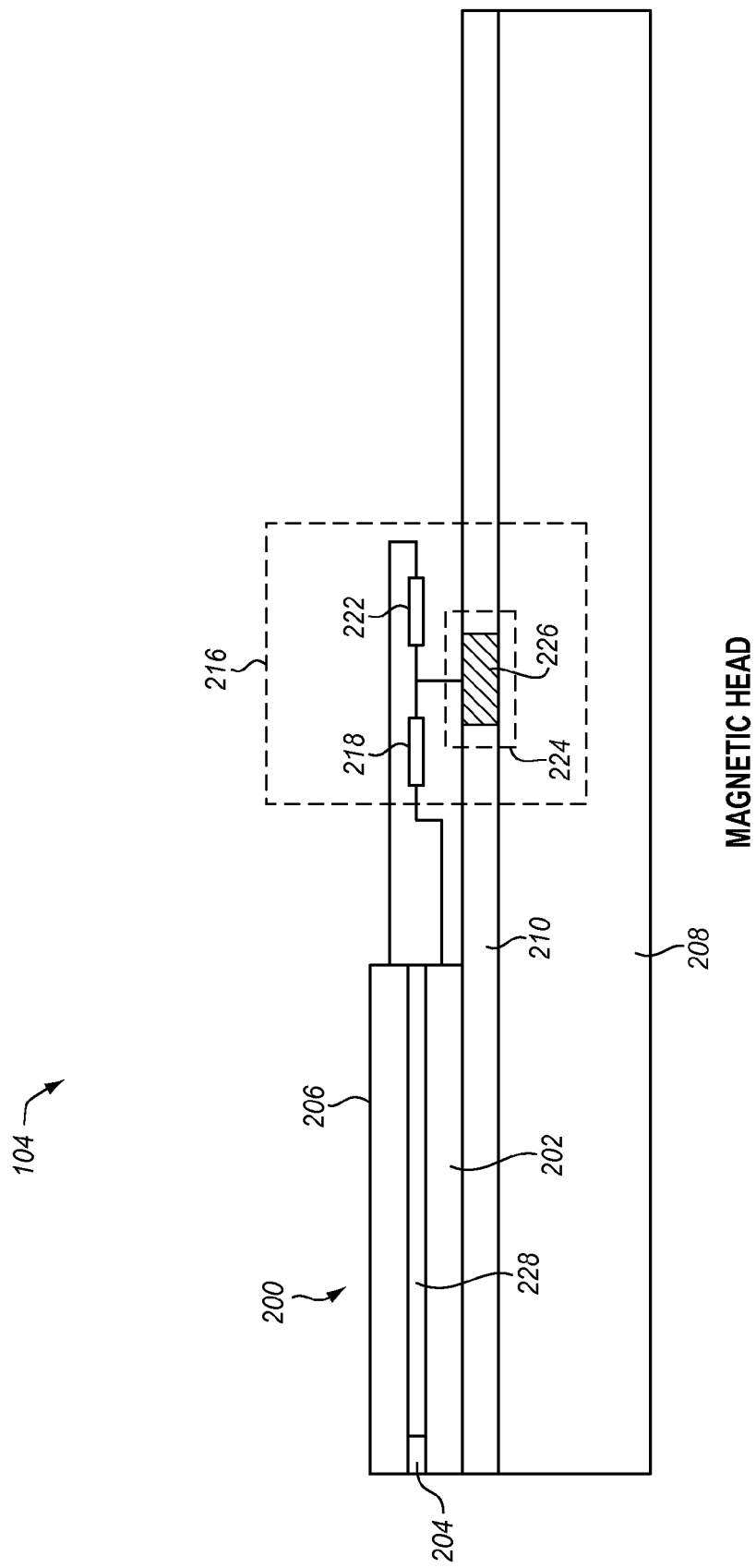
FIG. 2 illustrates a cross-sectional view of a typical read element fabricated in a magnetic head, which includes an ESD protection circuit.

FIG. 2 is a cross-sectional view illustrating a magnetic head 104 including a typical read element. When magnetic head 104 is formed, an insulating layer 210 is deposited on either a previously deposited conductive material or the conductive substrate 208 of wafer 102. Insulating layer 210 is used to isolate the conductive substrate 208. A read element 200 is formed on insulating layer 210. Read element 200 includes a first shield 202, an MR sensor 204, a second shield 206, and gap material 228. Read element 200 is being operated in CPP fashion, so first shield 202 comprises a first lead for read element 200 and second shield 206 comprises a second lead for read element 200. MR sensor 204 may comprise a CPP GMR sensor, a TMR sensor, or another type of MR sensor being operated in CPP mode.

In order to protect the MR element 204 from ESD damage, an ESD protection circuit 216 may be formed along with read element 200. The ESD protection circuit 216 includes a ground connection 224 and resistors 218 and 222. Resistors 218 and 222 are connected to the first shield 202 and the second shield 206 to dissipate any stored charge from shields 202, 206 to the ground connection 224.

In order to fabricate ground connection 224, a hole is formed in insulating layer 210 to expose the conductive substrate 208. The hole may be formed by a milling process, an etch process, a lift-off process, or another process to remove a portion of insulating layer 210. A second conductive layer 226 is deposited in the hole in insulating layer 210 to electrically connect to the conductive substrate 208. If a hole in insulating layer 210 is formed incorrectly, for example, if insulating material is left in contact with the conductive substrate 208, then an electrical connection between the second conductive layer 226 and the conductive substrate 208 may not be formed correctly. Furthermore, if the second conductive layer 226 is deposited incorrectly, for example, if it contains a void or space preventing electrical contact with the conductive substrate 208, then the electrical connection may not be formed correctly. Without an adequate ground connection 224, the ESD protection resistors 222 and 218 will not operate to protect MR element 204 from potential ESD damage.

Although it would be advantageous to directly determine if the ground connection 224 is fabricated correctly in read element 200, it may not be feasible to do so. Thus, it would be desirable to be able to verify the fabrication process of ground connection 224 using test components 106.

Figure 3:
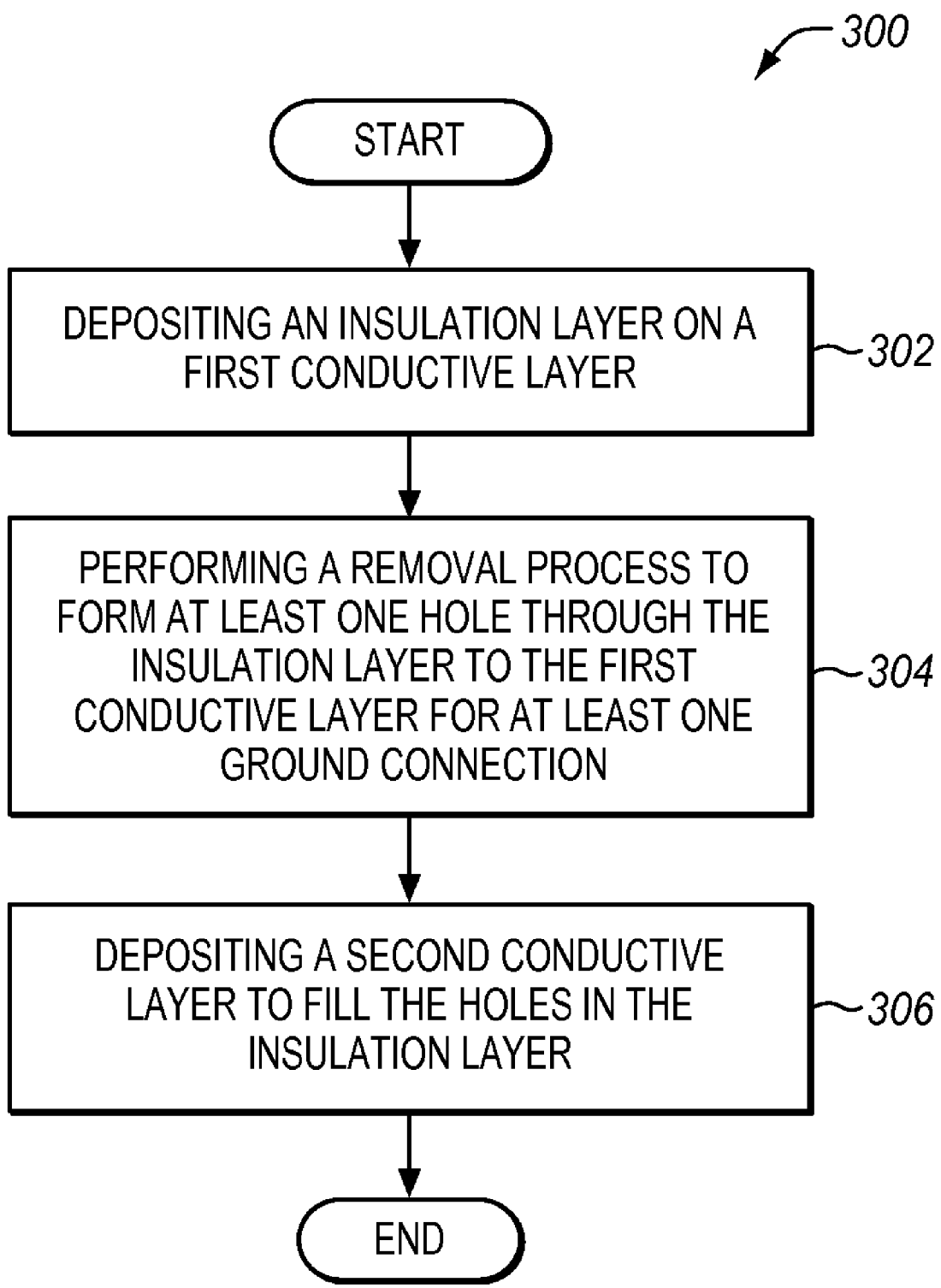
FIG. 3 is a flow chart illustrating a method of fabricating a test component on a wafer in an exemplary embodiment of the invention.

FIG. 3 is a flow chart illustrating a method 300 of fabricating test component 106 on wafer 102 in an exemplary embodiment of the invention. The steps of method 300 in FIG. 3 are not all inclusive and may include other steps not shown.

Figure 4:
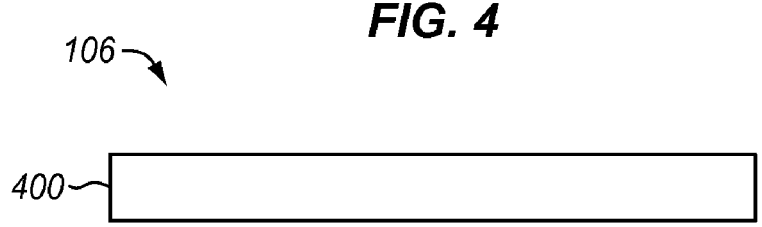
FIG. 4 is a cross-sectional view of the test component with a first conductive layer in an exemplary embodiment of the invention.

FIG. 4 is a cross-sectional view of test component 106 with a first conductive layer 400. Conductive layer 400 may be any desired electrically conductive material, such as NiFe, Cu, or material used to form a shield in magnetic head 104. Conductive layer 400 may also be the conductive substrate 208 in read element 200 (see FIG. 2).

Figure 5:
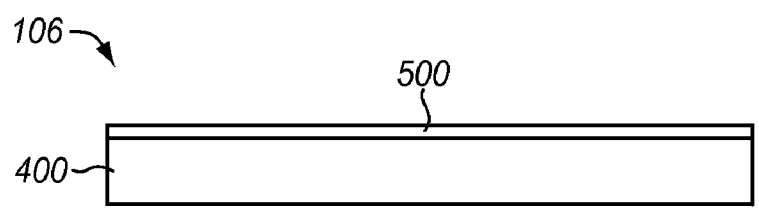
FIG. 5 is a cross-sectional view of the test component with an insulation layer deposited according to the method of FIG. 3 in an exemplary embodiment of the invention.

Step 302 of FIG. 3 comprises depositing an insulating layer on first conductive layer 400. FIG. 5 is a cross-sectional view of test component 106 with insulation layer 500 deposited according to step 302. Insulating layer 500 is deposited using a material that is not electrically conductive, such as alumina, which acts as insulation between two conductive layers. Insulation layer 500 covers the photoresist 500, and the first conductive layer 400. Insulating layer 500 may be deposited concurrently with insulating layer 210 of read element 200 (see FIG. 2).

Figure 6:
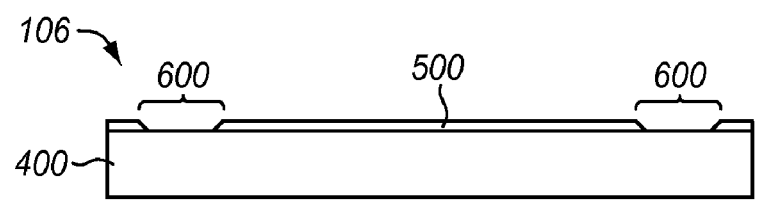
FIG. 6 is a cross-sectional view of the test component after a removal process is performed according to the method of FIG. 3 in an exemplary embodiment of the invention.

Step 304 of FIG. 3 comprises performing a removal process to form the holes through the insulation layer 500 for the ground connections. FIG. 6 is a cross-sectional view of test component 106 after the removal process is performed according to step 304. The removal process removes a portion of insulation layer 500 leaving holes 600 to expose the first conductive layer 400. The removal process which removes insulation layer 500 in test component 106 may concurrently remove a portion of insulation layer 210 on read element 200 to define a hole (not shown) through insulating layer 210 for ground connection 224 (see FIG. 2).

Figure 7:
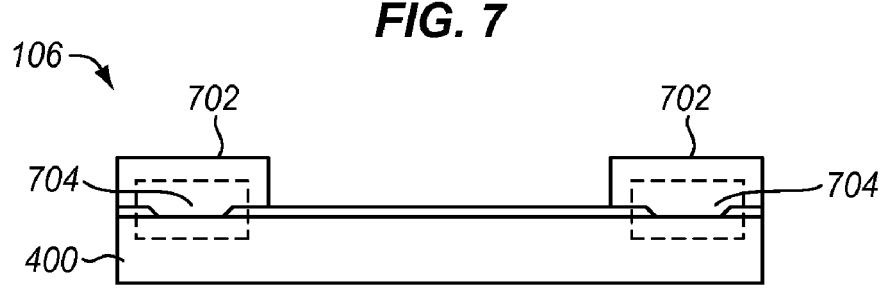
FIG. 7 is a cross-sectional view illustrating the test component fabricated according to the method of FIG. 3 in an exemplary embodiment of the invention.

Step 306 of FIG. 3 comprises depositing a second conductive layer to fill holes 600 in insulation layer 500. FIG. 7 is a cross-sectional view of test component 106 with the second conductive layer 702 deposited according to step 306. Second conductive layer 702 is deposited in holes 600 formed from the removal process to form ground connections 704. Depositing the second conductive layer 702 in test component 106 may occur concurrently with depositing the second conductive layer 226 in read element 200 (see FIG. 2).

Figure 8:
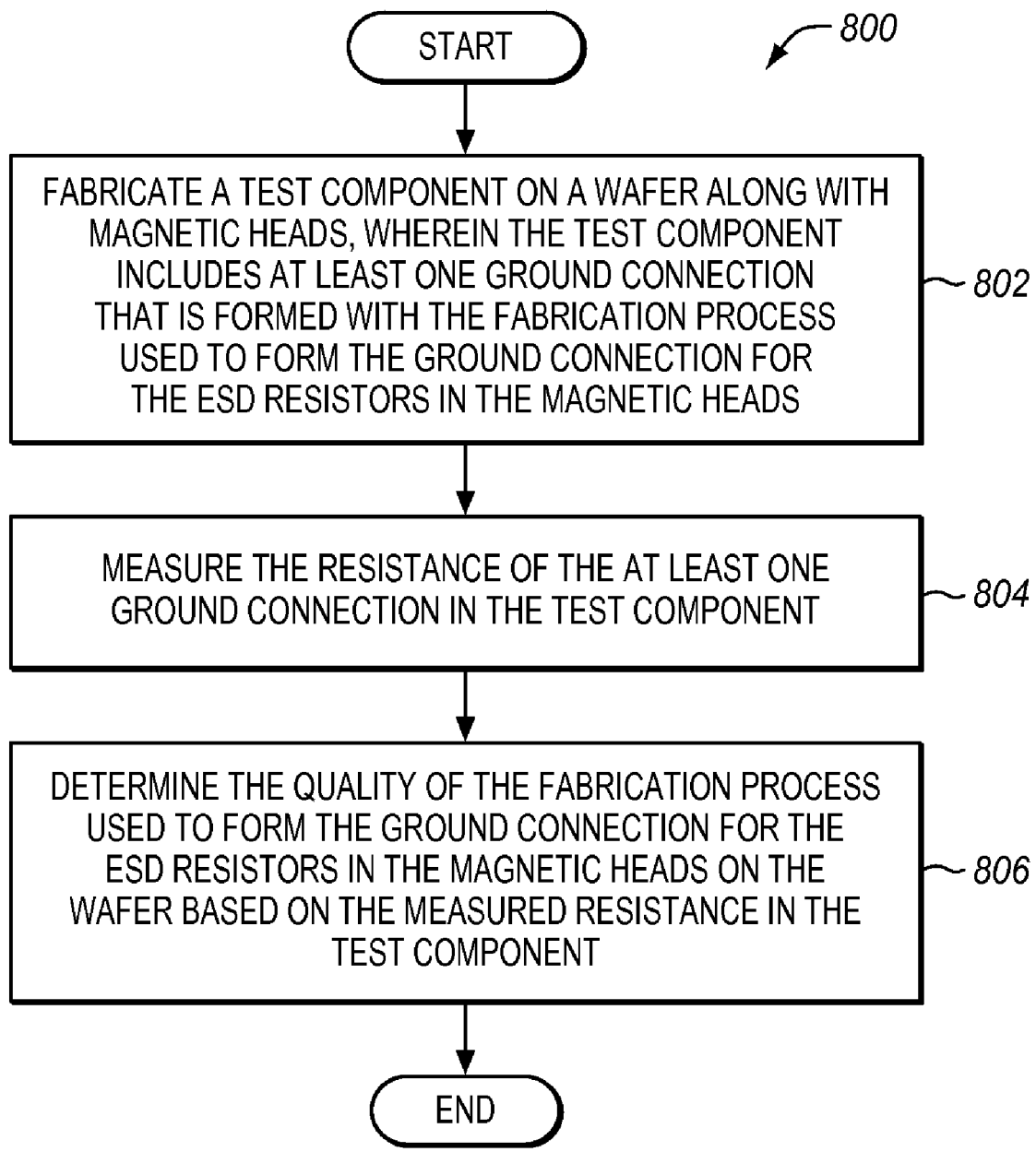
FIG. 8 is a flow chart illustrating a method of determining the quality of the fabrication process used to form a ground connection for ESD resistors in magnetic heads in an exemplary embodiment of the invention.

FIG. 8 is a flow chart illustrating a method 800 of testing the quality of the fabrication process used to form a ground connection 224 for ESD resistors 218 and 222 in magnetic heads 104 in an exemplary embodiment of the invention. The steps of the flow chart in FIG. 8 are not all inclusive and may include other steps not shown.

Step 802 of FIG. 8 comprises fabricating a test component 106 on a wafer 102 along with magnetic heads 104 (See FIG. 1). Test component 106 may be fabricated as described in FIGS. 3-7 to include one or more ground connections 704 formed from the fabrication process.

Figure 9:
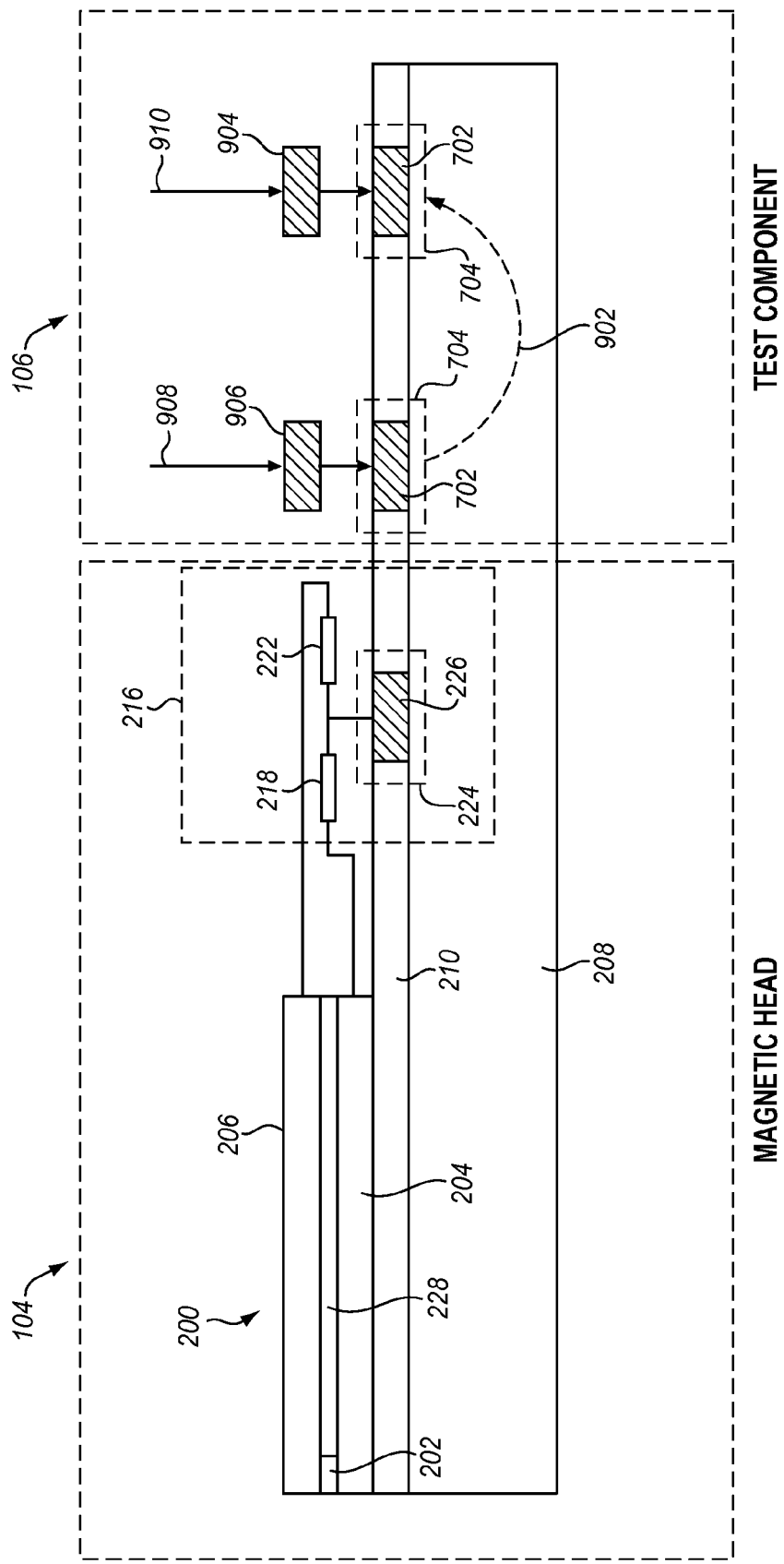
FIG. 9 is a cross-sectional view of the test component and the magnetic head fabricated on a wafer in an exemplary embodiment of the invention.

One assumption is that the same or similar fabrication processes are used to fabricate test components 106 and magnetic head 104 on wafer 102. For instance, the same fabrication steps may be used to form the ground connection 224 for the ESD resistors 218, 222 in the read element 200 (see FIG. 2) as in the ground connections 704 in the test component 106 (see FIG. 7). For example, performing a removal process to form holes for the ground connection 224 for the ESD resistors 218, 222 in the magnetic heads 104 may occur concurrently with performing a removal process to form holes 600 through insulation layer 500 in test component 106 (see FIG. 6). Furthermore, depositing a second conductive layer 702 in holes 600 through insulation layer 500 (see FIG. 7) in the test component 106 may occur in the same fabrications steps as depositing the second conductive layer 226 in the magnetic heads 104 (See FIG. 2). Thus, the quality of the fabrication processes used to form ground connection 224 for the ESD resistors 218, 222 of the magnetic heads 104 may be determined through test component 106 and test system 110 (see FIG. 1). FIG. 9 illustrates a magnetic head 104 and a test component 106 fabricated on wafer 102.

Step 804 of FIG. 8 comprises measuring a resistance of one or more ground connections 704 in the test component 106. In FIG. 9, test component 106 includes ground connections 704 fabricated by the same or similar processes used to fabricate the ground connection 224 in the magnetic head 104. Test pads 904 and 906 in electrical contact with ground connections 704 in test component 106 allow a resistance measurement to be performed by the test system 110 of FIG. 1 using probes 908 and 910. For example, test system 110 may inject a known current into test pad 906 using probe 908. Test pad 904 and probe 910 would complete the return current path through current path 902. By measuring the voltage between test probes 908 and 910, a series resistance of the two ground connections 704 can be calculated. If the ground connections 704 in test component 106 have been fabricated correctly, then the measured series resistance along current path 902 through conductive substrate 208 should indicate a low resistance, such as a short circuit. Test system 110 may include a four-point probe and associated processing capabilities that is able to measure a resistance of test component 106.

Step 806 comprises determining the quality of the fabrication process used to form the ground connection 224 for ESD resistors 218, 222 in the magnetic heads 104 based on the measured resistance of test component 106. Because ground connections 704 in test component 106 are fabricated by the same or similar process as ground connection 224 in read element 200, fabrication problems in the ground connections 704 in test component 106 may indicate problems with the ESD resistor ground connection 224. Thus, if the measured resistance in test component 106 is greater than 2 ohms, then this would indicate that the ground connection 224 in the magnetic head 104 may not have been fabricated correctly, and that the fabrication process is inadequate. Upon determining that the fabrication process is inadequate, a signal may be issued to a fabrication operator to indicate that the fabrication process may need to be adjusted. Furthermore, if the measured resistance in test component 106 is less than 2 ohms, then this may indicate that the ground connection 224 in the magnetic head 104 has been fabricated correctly, and that the fabrication process is adequate. Upon determining that the fabrication process is adequate, a signal may be issued to a fabrication operator to indicate that the fabrication process is operating correctly.

Although specific embodiments were described herein, the scope of the invention is not limited to those specific embodiments. The scope of the invention is defined by the following claims and any equivalents thereof.

We claim:

1. A method of testing the quality of a fabrication process used to form a ground connection for electrostatic discharge (ESD) resistors in magnetic heads on a wafer, the method comprising:

fabricating a test component on the wafer along with magnetic heads, wherein the test component includes at least one ground connection that is formed with the fabrication process used to form the ground connection for the ESD resistors in the magnetic heads;

measuring a resistance of the at least one ground connection in the test component; and determining the quality of the fabrication process used to form the ground connection for the ESD resistors in the magnetic heads on the wafer based on the measured resistance in the test component.

2. The method of claim 1 wherein fabricating a test component on the wafer along with magnetic heads comprises:

depositing an insulation layer on a first conductive layer;

performing a removal process to form at least one hole through the insulation layer to the first conductive layer for at least one ground connection; and depositing a second conductive layer to fill the at least one hole in the insulation layer to form the at least one ground connection.

3. The method of claim 2 wherein depositing a second conductive layer to fill the hole in the insulation layer to form the at least one ground connection comprises:

depositing material used to form a shield in a magnetic head.

4. The method of claim 1 further comprising:

indicating that the quality of the fabrication process is at an acceptable level responsive to the measured resistance being less than 2 ohms.

5. The method of claim 1 further comprising:

indicating that the quality of the shunt fabrication process is below an acceptable level responsive to the measured resistance being greater than 2 ohms.

6. The method of claim 1 wherein fabricating a test component comprises:

fabricating a plurality of test components staggered throughout the wafer.

7. The method of claim 1 further comprising:

forming a first test pad in electrical contact with a first ground connection in the test component;

forming a second test pad in electrical contact with a second ground connection in the test component;

measuring a resistance between the first test pad and the second test pad in the test component; and determining the quality of the fabrication process used to form the ground connection for the ESD resistors in the magnetic heads on the wafer based on the measured resistance in the test component.

8. A method of testing the quality of a fabrication process used to form a ground connection for electrostatic discharge (ESD) resistors in magnetic heads on a wafer, the method comprising:

fabricating a test component on the wafer concurrently with the magnetic heads by:

depositing an insulation layer on a first conductive layer;

performing a removal process to form at least one hole through the insulation layer to the first conductive layer for at least one ground connection; and depositing a second conductive layer to fill the at least one hole in the insulation layer to form the at least one ground connection;

measuring a resistance of the at least one ground connection in the test component; and determining the quality of the fabrication process used to form the ground connection for the ESD resistors in the magnetic heads on the wafer based on the measured resistance in the test component.

9. The method of claim 8 further comprising:

indicating that the quality of the fabrication process is at an acceptable level responsive to the measured resistance being less than 2 ohms.

10. The method of claim 8 further comprising:
indicating that the quality of the fabrication process is below an acceptable level responsive to the measured resistance being greater than 2 ohms.

11. A system comprising:
a test component on a wafer of magnetic heads, the test component comprising:
  a first conductive layer;
  an insulation layer formed on the first conductive layer, wherein at least one hole is formed in the insulation layer over the first conductive layer from a fabrication process used to form a hole for a ground connection for electrostatic (ESD) resistors in the magnetic heads; and
  a second conductive layer that fills the at least one hole, wherein the at least one hole is filled by a fabrication process used to form the ground connection for ESD resistors in the magnetic heads; and
a test system connected to the first conductive layer and the second conductive layer, which measures the resistance between the first and second conductive layers and outputs a quality of the fabrication process used to form the ground connection for ESD resistors in the magnetic heads on the wafer based on the measured resistance between the first and second conductive layers.

12. The system of claim 11 further comprising:
a first test pad in electrical contact with the first conductive layer; and
a second test pad in electrical contact with the second conductive layer;
wherein the first test pad and the second test pad allow a probe of the test system to measure the resistance between the first conductive layer and the second conductive layer.

* * * * *

UNITED STATES PATENT AND TRADEMARK OFFICE
CERTIFICATE OF CORRECTION

| | |
|---|---|
| PATENT NO. | : 7,768,268 B2 |
| APPLICATION NO. | : 11/965479 |
| DATED | : August 3, 2010 |
| INVENTOR(S) | : Araki et al. |

Page 1 of 1

It is certified that error appears in the above-identified patent and that said Letters Patent is hereby corrected as shown below:

In the Claims:
In column 6, line 25, claim 5 the text "the quality of the shunt fabrication process" should read "the quality of the fabrication process".

Signed and Sealed this

Twenty-sixth Day of October, 2010

David J. Kappos
*Director of the United States Patent and Trademark Office*